INVENTORS
PAUL SCHWAKE
BY ALFRED BRUDER

Burgess, Dinklage + Sprung
ATTORNEYS.

United States Patent Office 3,498,344
Patented Mar. 3, 1970

3,498,344
APPARATUS FOR FILLING BAGS WITH PRE-
WEIGHED QUANTITIES OF MATERIAL
Paul Schwake and Alfred Bruder, Oelde, Westphalia,
Germany, assignors to Haver & Boecker, Oelde, West-
phalia, Germany
Filed June 6, 1966, Ser. No. 555,348
Claims priority, application Germany, June 5, 1965,
H 56,242; Aug. 11, 1965, H 56,825
Int. Cl. B65b *3/06, 1/06;* G01g *13/02*
U.S. Cl. 141—317                                    1 Claim

ABSTRACT OF THE DISCLOSURE

An apparatus for filling bags with preweighed quantities of materials from a bulk supply to be packed within a single bag which is accomplished by gravity flow alone, the feed of the material from the supply hopper into the weighing vessel being controlled according to the position of the weighing scale beam, the flow passing through a conduit to guide the flow of the materials into the bag for containing same, and then into the bag which is held by the clamping device, which defines the bag opening in fixed communicating relation to the intermediate conduit outlet during the filling of the bag.

---

This invention relates in general to packaging machinery and more particularly to an apparatus for filling bags with preweighed quantities of materials.

While the invention is generally applicable to the mass production filling of various types of bags, it is particularly advantageous for use in filling heat-sealable plastic bags with dusty materials. In such cases, it is important that the peripheral portions of the bag which define its opening or neck be kept free from dust deposits, since these either preclude a satisfactory sealing of the bag by heat welding, or else produce a heat sealed closure joint which cracks and breaks open after a short time.

The invention provides an apparatus incorporating a weighing and filling system for filling bags which are held open by clamps of the filling device. Prior to filling, the quantity of material to be bagged is weighed by an automatic scale, and after weighing the material is dumped from the weighing vessel of the scale and passes into an intermediate conduit type container and thence into the bag which is held by the clamping device. The feed of material throughout the entire apparatus of the invention, i.e. from a bulk supply hopper to the bag, is accomplished by gravity flow alone and without any aid by mechanically driven conveyor devices. The feed of material from the supply hopper into the weighing vessel is controlled according to the position of the weighing scale beam. Thus, the invention provides a means for dispensing preweighed quantities of material from a bulk supply thereof, which dispensing means includes a refillable accumulator vessel for weighing and holding a preweighed quantity of material to be bagged within a single bag. This accumulator vessel has a bottom outlet and closure means associated therewith for selectively discharging by gravity flow through said outlet such preweighed quantities of material accumulated in the course of each bag filling cycle.

A conduit means disposed in underlying relation to the accumulator vessel outlet serves to receive materials discharged therefrom and to guide the flow of such materials to a bag for containing same. This conduit means has a terminal outlet disposed for communication with the opening of the bag to deliver material thereto by gravity flow. To secure the opening portion of the bag in fixed communicating relation to the terminal outlet during the filling operation, the invention provides a bracing means disposed for engagement with the periphery of the bag when it is in communication with the terminal outlet, and a plurality of clamp members disposed for extension from the terminal outlet into the opening of the bag, these clamp members being arranged for pivotal movement relative to the terminal outlet and outwardly with respect to the interior of the bag to clamp corresponding peripheral opening portions thereof against the bracing means.

A support frame disposed in adjoining relation to the terminal outlet of the conduit means is provided for supporting the bracing means and the clamp members which are pivotally connected to the frame for pivotal movement about generally horizontal axes as the axis of the terminal outlet can be considered to be generally vertical.

Although two or more clamp members can be used, according to a preferred embodiment of the invention, a pair of oppositely disposed clamp shells are provided, with each clamp shell being arranged in partially surrounding relation to the terminal outlet to inhibit the collection of material dust particles between said clamp shells and the interior surface of the bag portions which they contact. The pivotal movement of these clamp shells is effected by a pair of linear actuators each connected to the frame and to a corresponding clamp shell for selectively pivoting said clamp shells in unison inwardly to accommodate the insertion of a bag opening over and around the clamp shells, and outwardly, apart from one another, to clamp said bag opening portions against the bracing means during the filling of the bag.

To accommodate the clamping and filling of bags having various opening portion sizes, the invention provides means preferably in the form of adjustment screws for selectively adjusting the position of the bracing means with respect to the axis of the terminal outlet.

To further aid in the prevention of dust collection upon the opening portions of the bag, a pair of elastic web members are provided. Each web members is connected to the opposing lateral end portions of the clamp shells and extends therebetween to define with said clamp shells a laterally enclosed material flow passage therethrough which extends from the terminal outlet into the interior of the bag being filled. These web members are arranged for contacting engagement for the corresponding peripheral portions of the bag opening when the clamp shells are pivoted outwardly to clamp their corresponding bag opening portions against the bracing means, so that when the bag is being filled, the clamp shells and web members contact the bag around the circumference of its interior surface defining the opening thereof thereby preventing the collection of dust particles upon those portions of the bag which will later be heat-sealed.

To further aid in eliminating dust during the filling of the bags, the invention provides a vacuum duct connected to the conduit means and disposed for communication therewith in proximity to the terminal outlet for aspirating such dust particles as are released during the bag filling operation. This vacuum duct can be connected to any conventional vacuum source for operation thereby.

The bag filling apparatus of the invention is readily adapted to the mass production filling of bags when used in combination with a conveyor means disposed in underlying relation to the clamp shells and bracing means that secure the opening portion of the bag during filling operations. With such a conveyor means, the bottom of the bag being filled can be supported to relieve strain around the clamped opening portion, and the filled bags can be transported away from the filling position defined by the clamp shells and bracing means. To hold the bags being filled in an upright position during the filling operation, a lateral support means disposed for engagement with bags being filled at the filling station can be expediently provided.

In prior art bag packing machines, filling spouts are known which consist of a tube over which the empty bag is fitted and is held by the hand of the operator. This type of tube is either round or oval shaped, but in any case, the circumference of the tube must necessarily be smaller than the circumference of the bag. If the material to be bagged is dusty, dust escapes between the tube and the margin of the bag. To prevent this, it is known in the prior art to sinch the bag onto the tube with a strap. This method of dust prevention has, in addition to its awkwardness, the disadvantage that the tightly clamped margin of the bag is subjected to high stresses and particularly in the case of plastic bags frequently becomes cracked, thereby making it quite difficult, if not impossible, to weld the opening of the bag together for sealing.

Furthermore, other filling spouts are known which, in order to facilitate the drawing on of the empty bag, consist of two shells which, when the empty bag is pulled on, are closed up conically in the manner of a bird's bill. Then, to hold the bag in place, they are spread apart against stationary jaws by one or more compressed air cylinders so as to clamp the bag in place.

In the filling of plastic bags, however, it has become very annoyingly apparent that the bag wall portion between the spread shells is not covered, and that dust deposits upon such bag portion, especially since plastic material usually accumulates an eletrical charge which attract the particles of dust.

Since even the slightest deposit of dust suffices to render welding by the prior art methods impossible, attempts have been made to create devices which remove the dust before welding, and although this can be done, such dust removal is very difficult and expensive. Attempts have also been made to develop sealing machines which create a perfect weld seam in spite of the dust. This has hitherto been successful in but a few cases wherein the dust was of a benign nature, but even in a number of these purportedly successful cases, it developed that the dust embedded in the weld does no harm at the beginning, but after a few months' storage time the weld seams open.

It is the aim of the invention by simple means to create a filling and clamping device with automatic pre-weighing, which keeps the upper, inside, and later-to-be heat-sealed margin of a plastic bag free from any deposits of dust, and which makes possible a high bagging production speed, and thereby eliminates the previous difficulties.

It is, therefore, an object of the invention to provide an apparatus for filling bags with preweighed quantities of materials.

Another object of the invention is to provide an apparatus as aforesaid which is adaptable to filling heat-sealable plastic bags with dusty materials.

A further object of the invention is to provide an apparatus as aforesaid which effectively prevents the depositing of dust particles upon those portions of the bag which are later to be heat-sealed.

A further object of the invention is to provide an apparatus as aforesaid wherein the overall transfer of material from a bulk supply thereof to the bags is accomplished by gravity flow alone.

A further object of the invention is to provide an apparatus as aforesaid having adjustment means which are adapted for filling various sizes of bags.

Still another further object of the invention is to provide an apparatus as aforesaid which is conveniently adaptable for use in multiple station, mass production bag filling arrangements.

Other and further objects and advantages of the invention will become apparent from the following detailed description and accompanying drawings in which.

Figure 1:
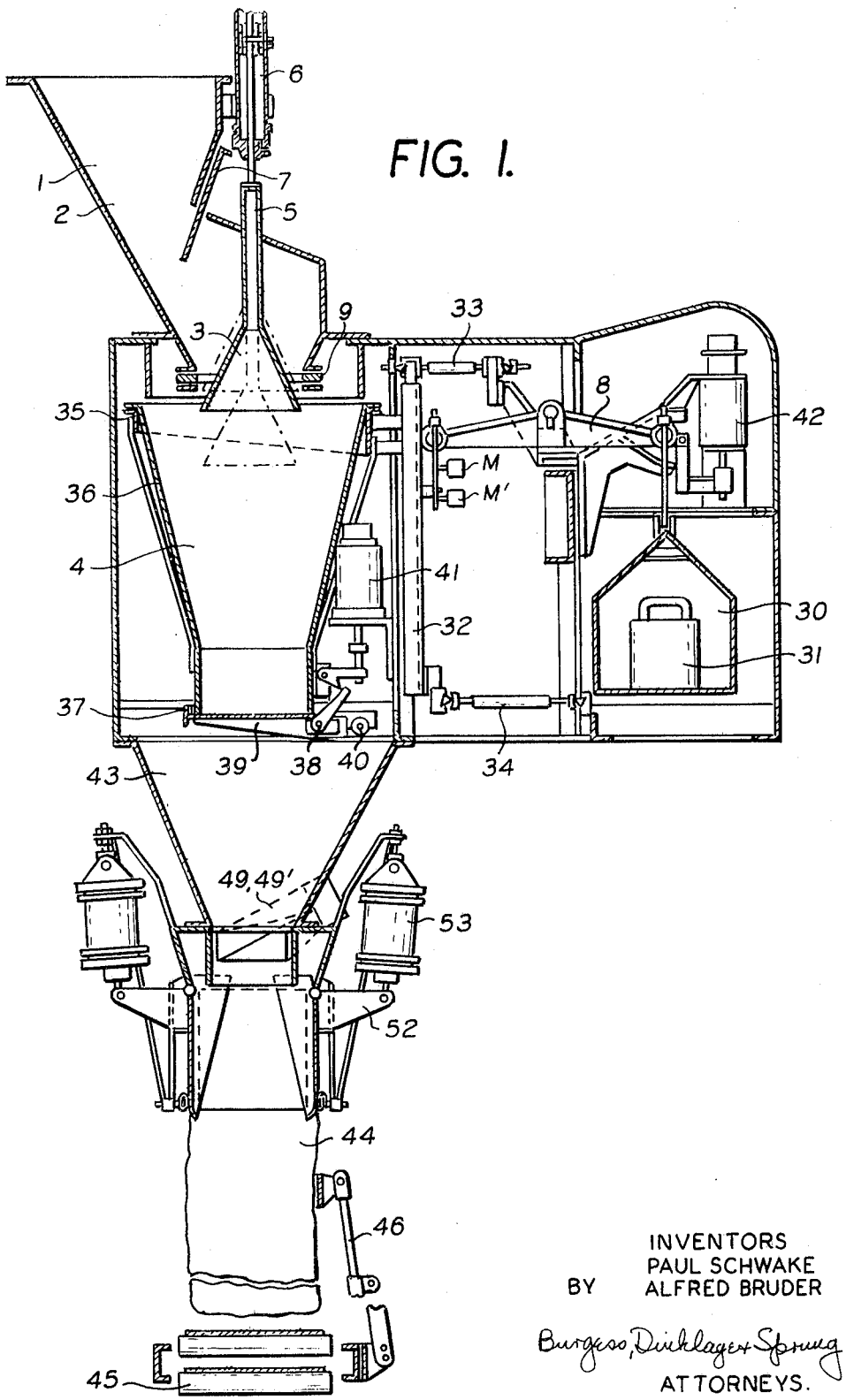
FIG. 1 is an elevation view, partly in section of a bag filling apparatus according to a preferred embodiment of the invention and illustrating the manner in which the bags are secured thereto during filling operations.

Referring now to FIG. 1, the material to be packaged into bags is stored in bulk in a supply hopper 1 and is dispensed therefrom through a bottom outlet 2 into the weighing accumulator vessel 4 of an automatic scale whenever the conical valve 3 is positioned to define an open passage through the discharge outlet 2. The weighing vessel 4 functions as a refillable accumulator vessel 4 to hold pre-weighed quantities of material to be packed within a single bag during each filling cycle, and the vessel 4 has a bottom outlet enclosure means associated therewith for selectively discharging by gravity flow the pre-weighed quantities of material accumulated.

The conical valve 3 is connected by a rod 5 to a linear actuator 6 for controlled operation thereby. Since the flow characteristics differ from one material to another, the rate of flow of material from the hopper 1 can be further regulated by means of a shutter 7. The positioning of the cone valve 3 is controlled in response to the weight of material accumulated in the vessel 4 as indicated by the position of a scale beam 8 in the weighing apparatus. Under the control of the position of scale beam 8, the cone valve 3 is drawn by the linear actuator 6 into the solidly drawn middle position indicated in FIG. 1 shortly before the specified bag fill weight is reached. This greatly reduces the flow rate of material from the hopper 1 and affords a more precise control over the ultimate weight of material accumulated in the vessel 4. When the specified bag fill wegiht is reached, the cone valve 3 is drawn into its uppermost position for sealing engagement with the outlet 2 as represented by the dash-dotted outline in FIG. 1. A completely tight sealing of the outlet 2 by the cone valve 3 is achieved by the aid of a rubber seal 9 mounted around the circumference of the outlet 2.

Figure 5:
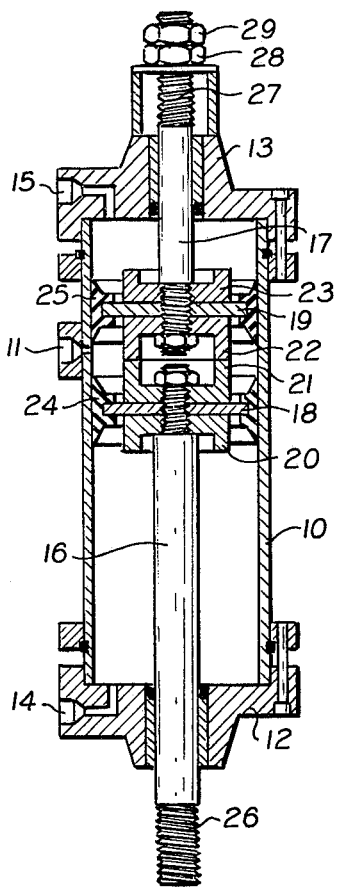
FIG. 5 is a detail view, partly in section, of a linear actuator used in the apparatus of FIG. 1 for regulating the flow of materials from the bulk supply into the weighing vessel thereof.

The operation of the linear actuator 6 which controls the operation of the cone valve 3 is best explained by reference to FIG. 5. As shown therein, the cylinder 10 of said actuator 6 is provided with a middle compressed air connection 11, and at the end extremities of said cylinder 10 are fastened end caps 12 and 13 which are respectively provided with a bottom compressed air connection 14 and a top compressed air connection 15.

The actuator 6 is a dual piston acutator and has two piston rods 16 and 17 which are guided and sealed in caps 12 and 13. The rod 16 bears a piston consisting of the piston plate 18, the stop members 20 and 21, and a seal member 24. The rod 17 bears a similarly constructed piston which consists of a piston plate 19, stop members 22 and 23, and a seal member 25. The piston rod 16 has a threaded end portion 26 which is adapted for screw connection to the rod 5 for positioning the cone valve 3. The piston rod 17, which is the thinner of the two piston rods 16 and 17, also has a threaded end portion 27 on which an adjustable stop nut 28 is secured in place by a lock nut 29.

The three different positions, i.e. fully opened, partially opened (or closed), and fully closed, of the cone valve 3 are attained as follows:

When the middle compressed air connection 11 is fed with compressed air while the connections 14 and 15 are relieved or vented, both pistons of actuator 6 move outward until their stop members 20 and 23 contact the caps 12 and 13. This causes the cone valve 3 to assume its lowermost, or fully opened position. The middle position or restricted flow position of the cone valve 3 is attained when the middle compressed air connection 11 is relieved and compressed air is fed to both the top and bottom connections 15 and 14. Since the piston rod 16 is larger in cross-sectional area than piston rod 17, the effective area of the upper piston is larger, and because the stroke of the upper piston is substantially shorter than that of the lower piston, a cone valve position determinated by the stop nut 28 will be precisely and repeatably attained. To attain the uppermost or fully closed cone valve 3 position, the upper compressed air connection 15 is also relieved so that compressed air is fed only through the bottom connection 14. Hence both pistons will be driven upwardly together until stop member 23 contacts cap 13 and the two stop members 21 and 22 bear against one another. The material flow cross-section from the hopper 1 that exists when the cone valve 3 is driven to its middle or restricted flow position can be increased or diminished within limits by adjustment of the position of stop nut 28 on piston rod 17 so as to compensate for the flow characteristics of various materials to be packaged.

To achieve the intended preweighing and dispensing operation, the linear actuator 6, and hence the operation of the cone valve 3 is controlled in accordance with the position of a scale beam 8. The scale beam 8 is of the equal-armed type and at its rear end bears a counterweight box 30 with counterweights 31. On the front end of the scale beam 8 is suspended a load carrier 32, which is held in a vertical position by upper links 33 and lower links 34 and which bears the weighing vessel 4. The weighing vessel 4 consists of an upper gripping frame 35, a rubber liner 36 and a lower gripping frame 37 which generally defines the discharge outlet of said vessel 4 and to which is fastened a trapdoor 39 which is pivotally connected at 38 to function as a closure means for the bottom outlet of the vessel 4. In the unloaded state, the trapdoor 39 is forced by a counterweight 40 into a normally closed position in which it is latched by an electromagnetic latching device 41 which is fastened to the scale frame. After the cone valve 3 is closed to interrupt the flow of materials into the vessel 4 from hopper 1, which occurs upon attaining the established bag fill weight in said vessel 4, the latching device 41 is energized to unlatch and release the trapdoor 39, which is then pushed down into substantially a fully opened position by the material flowing down from the vessel 4.

For the sake of simplification, the electrical and pneumatic control system arrangement for operating the actuator 6 and electromagnetic latching device 41 have not been shown in detial, since systems of this kind are known in the prior art, but will be described hereinafter. A microswitch M senses the full-flow position of the scale beam 8 when the cone valve 3 is fully opened as at the beginning of each weighing operation, and said microswitch M is depressed by contact with the scale beam 8 to establish a switching state that operates a solenoid valve (not shown) to control the flow of compressed air and venting of the actutaor 6 in such a manner that the pistons thereof are driven against opposite end caps 12 and 13 to drive the cone valve 3 to its lowermost or full-flow position.

Shortly before the specified bag fill weight is obtained, the position of the scale beam 8 shifts so that the microswitch M is no longer depressed and established another switching state causing solenoid valve action to drive the pistons of the linear actuator 6 into their middle positions thereby positioning the cone valve 3 to its restricted, or slow-flow position. To prevent the scale beam 8 from swinging too far or oscillating as a result of the shifting of the cone valve 3 from its full-flow to its restricted flow position and thereby causing erroneous operation, the scale beam 8 is held temporarily during this changeover period by a stopping magnet 42. After a holding period that can be adjusted by means of a time-delay relay, of approximately 0.3 second, the stopping magnet 42 is de-energized and releases the scale beam 8.

After the filling of the vessel 4 with the specified weight of material, a second microswitch M' is operated by the scale beam 8 and energizes a second solenoid valve (not shown), which causes the linear actuator 6 to position the cone valve 3 at its shut-off position, after which the weighing vessel 4 is emptied by energizing the electromagnetic latching device 41 to release the trapdoor, of course providing a bag has been drawn into position for filling.

The weighed material drops into a catching funnel 43 and from therethrough the filling and clamping device into a bag 44. After each bag filling operation has ended, the bag is released and drops onto a conveyor belt 45 and, while leaning on a support 46, is carried upright on the belt 45 to a sealing machine (not shown).

Figure 2:
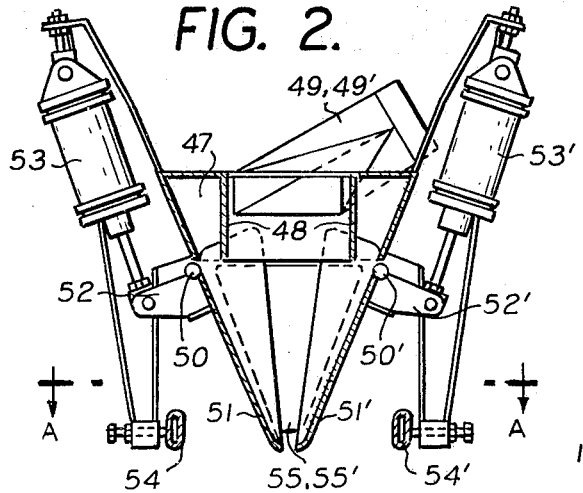
FIG. 2 is a detail view, partly in section of the bag holding portion of the apparatus of FIG. 1.

FIG. 2 shows the filling spout in the position for the drawing on of the empty bag. The frame 47 which carries all parts is a nearly rectangular box that is open at the bottom and closed on the top by a cover through which the filler tube 48 is carried, and which has two nozzles 49 and 49' which are to be connected to a vacuum cleaner (not shown). The lower end of the filler tube 48 defines a terminal outlet through which material discharged from the weighing vessel 4 passes into the bag. On the bottom margin of the frame 47, gripper shells 51 and 51' which serve for clamping the bag are mounted so as to be pivotable about the points 50 and 50'. This swinging movement is produced by the pneumatic cylinders 53 and 53' which are connected to the frame 47 and to the clamp shells 51 and 51' via levers 52 and 52'. The clamp shells 51 and 51' can be swung outwardly until they press the opening portion of the bag 44 against the jaws 54 and 54' which define a bracing means.

Figure 3:
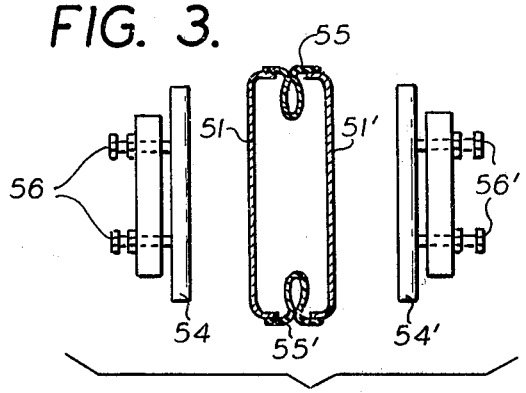
FIG. 3 is a sectional view through the apparatus portion shown in FIG. 2 taken along line A—A therein and under conditions wherein the clamp shells are retracted to accommodate the insertion or removal of a bag.
Figure 4:
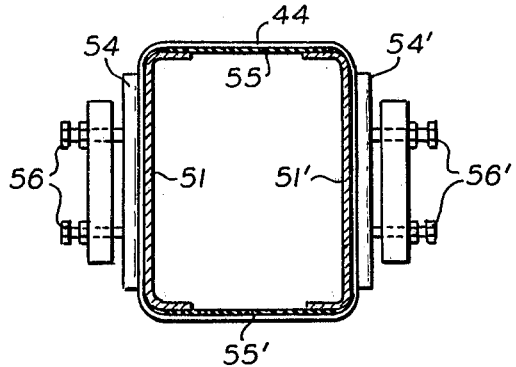
FIG. 4 is another sectional view taken along line A—A of FIG. 2, but illustrating the positions of the clamping device elements in the spread apart state corresponding to their bag holding configuration.

The clamp shells 51 and 51' partially surround the terminal outlet of the filler tube 48 and are arranged for movement on frame 47 with relatively little clearance so that as little air as possible is aspirated into the material flow passage defined by said clamp shells 51 and 51' in the spread-apart, bag gripping position. To the lateral end or side surfaces of the clamp shells 51 and 51' are fastened rubber webs 55 and 55' which are arranged to fold inwardly as illustrated by FIG. 3 when the shells 51 and 51' are in their retracted positions as when inserting or removing a bag 44. The webs 55 and 55' are stretched out fully as indicated by FIG. 4 when the clamp shells 51 and 51' are in the spread position.

The gripper or bracing jaws 54 and 54' can be adjustably positioned by means of adjusting screws 56 and 56' in such a manner that the circumference around the outspread clamp shells 51 and 51' is equal to the circumference of the mounted bag 44, so that said bag 44 will be contacted all around its opening portion internal surface periphery so as to prevent the deposit of dust thereupon which would later interfere with the quality of any heat-sealing performed on the bag 44. At the sides at which the bag 44 is gripped between the clamp shells 51 and 51' and the jaws 54 and 54', said bag 44 is secured against the depositing of dust, but at the sides on which the bag contacts only the outstretched rubber webs 55 and 55', such dust depositing protection is somewhat less than absolute. In order to obtain absolute protection against the depositing of dust along these web regions of the bag, connection of the ducts 49 and 49' to vacuum equipment (not shown) is necessary.

As it can be seen from FIG. 1, when the bag 44 is drawn on, an interior chamber, which is composed by the funnel-like conduit 43, the filling and gripping clamp shells 51 and 51', webs 55 and 55' and the bag 44, is under a vacuum induced by the connection of the ducts 49 and 49' to a vacuum cleaning source. Under such conditions ambient air will be drawn inwardly through any avialable openings, as for example at points where the bag contacts only the rubber webs 55 and 55'. Thus, the application of vacuum as contemplated by the invention serves two purposes, namely on the on hand to aspirate the bag so that it makes firmer contact with the rubber webs 55 and 55', and to assure on the other hand that air is aspirated from the outside by the vacuum at such points where the bag does not actually make a sealing contact. Consequently, any dust that rises when the bag is being filled can therefore never get to the upper margin of the bag to interfere with the success of later welding or sealing operations. A perfect welding or sealing of the bag is thus made possible.

The invention is applicable not only to bag packing machines in which the filler spouts are disposed in a row, such as in so-called row machines, but is also applicable to rotary packing machines. In the case of rotary packing machines, also designated as round packers, the feeding hopper 1 can be disposed stationarily with the proportioning apparatus and scale while the catching or guide funnel conduit 43 is arranged for movement past the operating station along with the filling and bag gripping portions of the apparatus.

From the foregoing description of the invention in terms of a preferred embodiment thereof, it will become obvious to the artisan that the invention is susceptible of numerous modifications and variations all within the scope of the invention. However, the invention is intended to be limited only by the following claim in which we have endeavored to claim all inherent novelty.

What is claimed is:

1. An apparatus for filling bags with preweighed quantities of materials comprising means for holding and dispensing preweighed quantities of materials from a bulk supply thereof, conduit means disposed in underlying relation to said holding and dispensing means to receive material discharged therefrom and to guide the flow of said materal into a bag for containing same having a terminal outlet disposed for communication with the opening of such bag to deliver said material thereto by gravity flow, a pair of oppositely disposed clamp shells each arranged in partially surrounding relation to the terminal outlet to inhibit the collection of material dust particles between said clamp shells and the interior surface of the bag portion which they contact, bracing means disposed for engagement with the periphery of such bag when said is disposed in communication with the terminal outlet including a support frame disposed in adjoining relation to the terminal outlet of said conduit means, and wherein said bracing means is operatively connected to said frame for support thereby, actutaor means operatively connected to said frame and to each of said clamp members for selectively pivoting same inwardly with respect to the axis of the terminal outlet to accommodate the insertion of the opening portion of a bag over and around said clamp members, and for pivoting said clamp members outwardly with respect to the terminal outlet axis to clamp said bag opening portions against the bracing means during the filling of said bag, wherein the improvement comprises: a pair of elastic web members each connected to the opposing lateral end portions of said clamp shells and extending therebetween to define with said clamp shells a laterally enclosed material flow passage therethrough and extending from said terminal outlet into the interior of the bag being filled, said web members being disposed for connecting engagement with corresponding peripheral portions of the bag which define the opening thereof when said clamp shells are pivoted outwardly to clamp their corresponding bag opening portion to the bracing means whereby when said bag is being filled, the clamp shells and web members contact the bag around the circumference of its interior surface defining the opening thereof to prevent collection of material dust particles thereon.

References Cited
UNITED STATES PATENTS

| | | | |
|---|---|---|---|
| 1,386,790 | 8/1921 | McLeod et al. | 177—106 |
| 2,376,810 | 5/1945 | Richardson | 141—314 X |
| 2,632,589 | 3/1953 | Rowland | 177—118 X |
| 2,903,230 | 9/1959 | Schachte | 177—118 |
| 3,149,649 | 9/1964 | Hix | 53—167 X |
| 2,753,097 | 7/1956 | Kindseth et al. | 53—389 |

HOUSTON S. BELL, JR., Primary Examiner

U.S. Cl. X.R.

141—93; 177—118

PO-1050
(5/69)

UNITED STATES PATENT OFFICE
CERTIFICATE OF CORRECTION

Patent No. 3,498,344      Dated March 3, 1970

Inventor(s) P. Schwake, et al

It is certified that error appears in the above-identified patent and that said Letters Patent are hereby corrected as shown below:

Col. 2, line 39, "members" (2nd occurrence) should be -- member --
Col. 5, line 59, "detial" should be -- detail --
Col. 6, line 74, after "vacuum" insert -- cleaning --
Col. 7, line 41, "materials" should be -- material --
Col. 8, line 6, "said" should be -- same --
Col. 8, line 25, "connecting" should be -- contacting --

SIGNED AND
SEALED
AUG 11 1970

(SEAL)
Attest:

Edward M. Fletcher, Jr.
Attesting Officer

WILLIAM E. SCHUYLER, JR.
Commissioner of Patents